(12) United States Patent
Fletcher

(10) Patent No.: US 11,877,905 B2
(45) Date of Patent: *Jan. 23, 2024

(54) ELASTICALLY DEFORMABLE BITE FORK STABILIZER AND ASSOCIATED METHODS

(71) Applicant: Gayle J. Fletcher, Conroe, TX (US)

(72) Inventor: Gayle J. Fletcher, Conroe, TX (US)

(*) Notice: Subject to any disclaimer, the term of this patent is extended or adjusted under 35 U.S.C. 154(b) by 225 days.

This patent is subject to a terminal disclaimer.

(21) Appl. No.: 17/164,569

(22) Filed: Feb. 1, 2021

(65) Prior Publication Data

US 2021/0153992 A1     May 27, 2021

Related U.S. Application Data

(60) Continuation of application No. 16/351,359, filed on Mar. 12, 2019, now Pat. No. 10,905,535, which is a division of application No. 15/644,433, filed on Jul. 7, 2017, now abandoned, which is a continuation of application No. 12/693,575, filed on Jan. 26, 2010, now abandoned.

(60) Provisional application No. 61/182,169, filed on May 29, 2009.

(51) Int. Cl.
*A61C 19/05* (2006.01)
*A61C 9/00* (2006.01)

(52) U.S. Cl.
CPC ............ *A61C 19/05* (2013.01); *A61C 9/0006* (2013.01)

(58) Field of Classification Search
CPC .............................. A61C 19/05; A61C 9/0006
USPC .......................................................... 433/71
See application file for complete search history.

(56) References Cited

U.S. PATENT DOCUMENTS

| | | | |
|---|---|---|---|
| 1,328,007 A | 1/1920 | Mannon et al. | |
| 2,414,747 A | 1/1947 | Kirschbaum | |
| 3,734,091 A | 5/1973 | Taplin | |
| 4,211,008 A | 7/1980 | Lerman | |
| 4,324,547 A | 4/1982 | Arcan et al. | |
| 4,326,513 A | 4/1982 | Schultz | |
| 4,482,321 A | 11/1984 | Tabor et al. | |
| 4,653,498 A | 3/1987 | New, Jr. et al. | |
| 4,693,683 A * | 9/1987 | Lee .......................... | A61C 9/00 |
| | | | 433/42 |
| 4,765,340 A | 8/1988 | Sakai et al. | |
| 2,618,853 A | 2/1989 | Singer et al. | |

(Continued)

FOREIGN PATENT DOCUMENTS

| | | |
|---|---|---|
| DE | 202007015247 | 3/2008 |
| GB | 2014456 | 8/1979 |

(Continued)

OTHER PUBLICATIONS

USPTO Non-Final Office Action for U.S. Appl. No. 12/693,575 dated Jul. 20, 2011.

(Continued)

*Primary Examiner* — Matthew M Nelson
(74) *Attorney, Agent, or Firm* — Tumey L.L.P.

(57) ABSTRACT

Methods and apparatus for stabilizing a bite fork in a patient's mouth. The apparatus may include an elastically deformable bite fork stabilizer. The elastically deformable bite fork stabilizer may include an elastically deformable layer, an adhesive layer on one side of the elastically deformable layer, and a removable layer adhered to the adhesive layer.

2 Claims, 5 Drawing Sheets

(56) References Cited

U.S. PATENT DOCUMENTS

| | | | | |
|---|---|---|---|---|
| 5,059,120 | A | * | 10/1991 | Lee ........................ A61C 19/05 433/48 |
| 5,176,515 | A | * | 1/1993 | Andrews .............. A61C 19/045 433/56 |
| 5,235,991 | A | * | 8/1993 | Minneman ........... A63B 71/085 433/140 |
| 5,266,031 | A | | 11/1993 | Marigza |
| 5,368,477 | A | | 11/1994 | Neeley |
| 5,381,799 | A | | 1/1995 | Hamilton et al. |
| 5,503,552 | A | * | 4/1996 | Diesso ...................... A61C 9/00 433/48 |
| 5,769,633 | A | | 6/1998 | Jacobs et al. |
| 5,807,103 | A | * | 9/1998 | Andrews ................ A61C 19/05 433/48 |
| 5,938,445 | A | * | 8/1999 | Kodama .................... A61F 5/56 433/37 |
| 6,109,265 | A | * | 8/2000 | Frantz ..................... A61F 5/566 128/862 |
| 6,582,931 | B1 | * | 6/2003 | Kois ....................... A61C 19/05 33/513 |
| 7,699,607 | B2 | * | 4/2010 | Margossian ......... A61C 19/045 33/513 |
| 7,955,077 | B2 | * | 6/2011 | Shindo ................... A61C 19/05 33/514 |
| 2007/0037116 | A1 | * | 2/2007 | Knutson .............. A61C 9/0006 433/68 |
| 2008/0032256 | A1 | * | 2/2008 | Thornton ............... A61C 11/06 433/57 |
| 2008/0187882 | A1 | * | 8/2008 | Margossian ......... A61C 19/045 433/68 |
| 2012/0040300 | A1 | * | 2/2012 | Levens .................... A61C 1/07 433/77 |

FOREIGN PATENT DOCUMENTS

| | | | | |
|---|---|---|---|---|
| GB | 2014456 | A | * 8/1979 | ........... A61C 9/0006 |
| GB | 2231772 | | 11/1990 | |

OTHER PUBLICATIONS

USPTO Final Office Action for U.S. Appl. No. 12/693,575 dated Jan. 19, 2012.
European Search Report for Application No. 10164215.5 dated Sep. 10, 2012.
USPTO Final Office Action for U.S. Appl. No. 12/693,575 dated Dec. 5, 2012.
USPTO Final Office Action for U.S. Appl. No. 12/693,575 dated May 16, 2013.
USPTO Final Office Action for U.S. Appl. No. 12/693,575 dated Dec. 23, 2013.
USPTO Final Office Action for U.S. Appl. No. 12/693,575 dated Jul. 24, 2014.
USPTO Patent Board Decision on Appeal for U.S. Appl. No. 12/693,575 dated May 12, 2017.
European Examination Report for Application No. 10164215.5 dated Jun. 13, 2018.
Stewart, Kenneth L., Clinical Removable Partial Prosthodontics, 1988, pp. 158-166.
"Face-Bow Fork." Free Online Medical Dictionary, 2012, available at http://medical-dictionary.thefreedictionary.com/bite+fork.

* cited by examiner

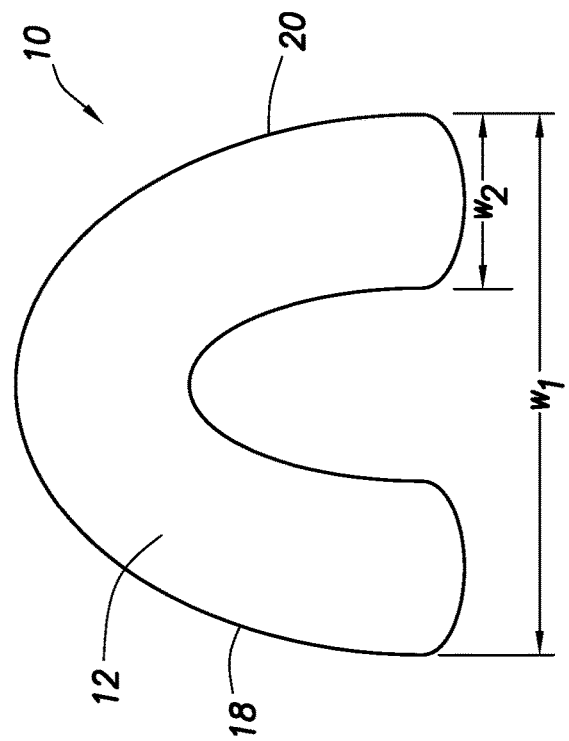
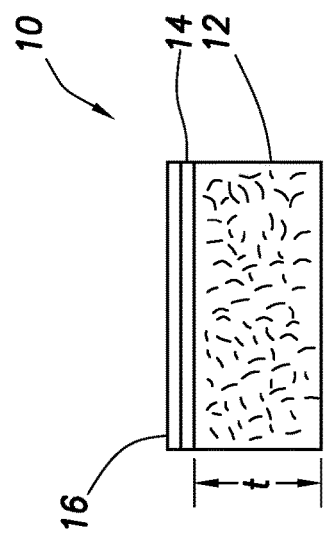
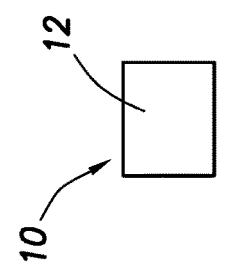
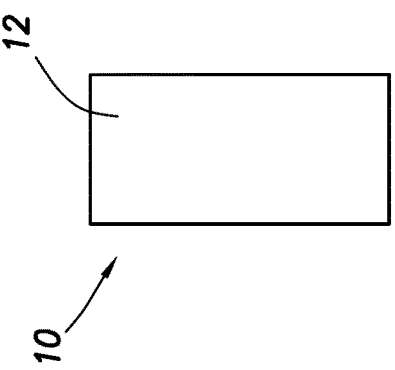
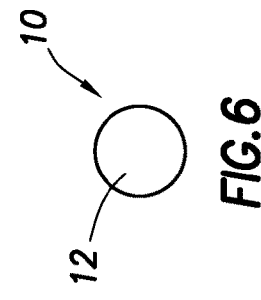
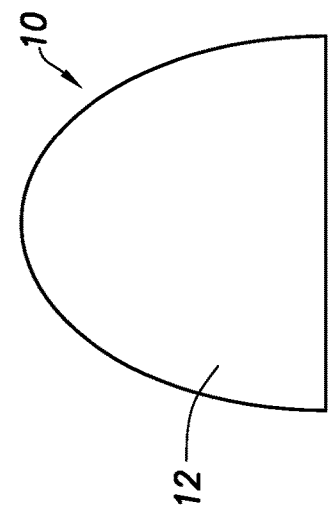

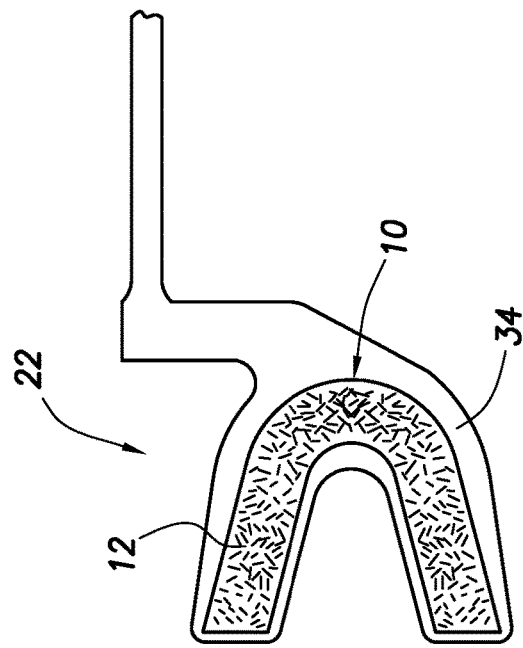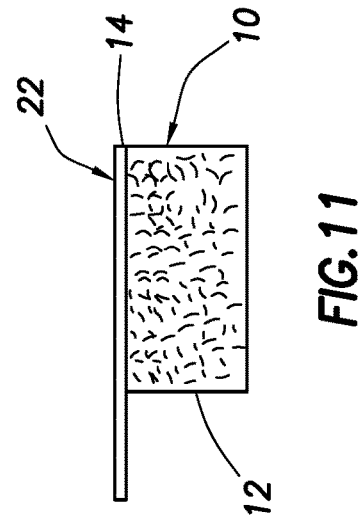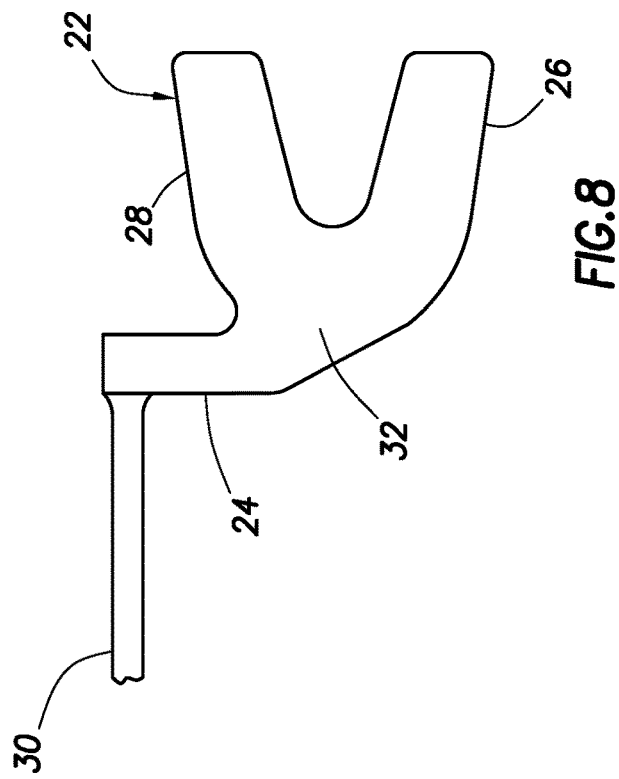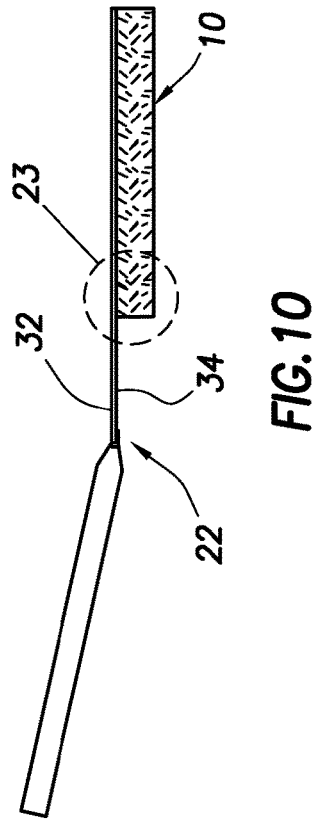

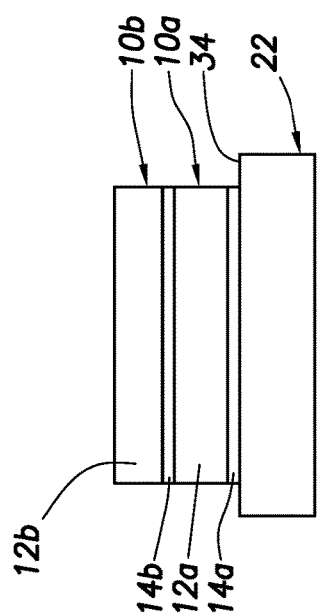
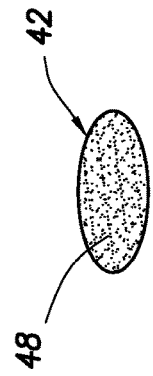
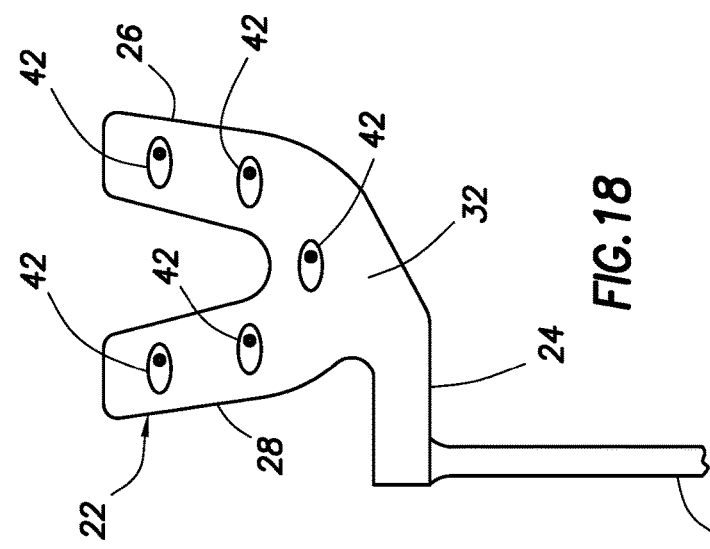
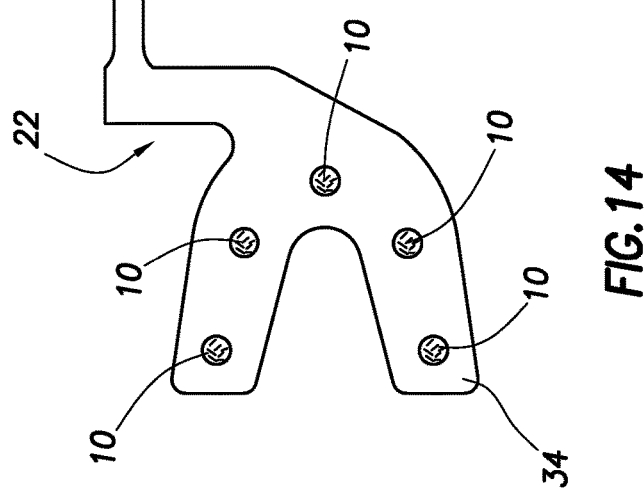
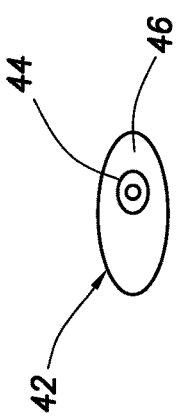

ELASTICALLY DEFORMABLE BITE FORK STABILIZER AND ASSOCIATED METHODS

CROSS-REFERENCE TO RELATED APPLICATION

This application claims priority to U.S. patent application Ser. No. 16/351,359, entitled "Elastically Deformable Bite Fork Stabilizer and Associated Methods," filed on Mar. 12, 2019, which claims priority to U.S. patent application Ser. No. 15/644,433, filed Jul. 7, 2017, which claims priority to U.S. patent application Ser. No. 12/693,575, filed Jan. 26, 2010, which claims priority to U.S. Provisional Application No. 61/182,169, filed on May 29, 2009, the disclosures of which are incorporated herein by reference.

BACKGROUND

This invention relates to the field of dental instruments and, more particularly, in one or more embodiments, to elastically deformable bite fork stabilizers and associated methods.

The process used to relate the maxillary teeth as they exist in the patient to a mechanical jaw simulator includes the use of a bite fork. A bite fork generally provides a platform which allows an impressionable material to record the upper position of the teeth as they relate to the cranial base. In general, a bite fork may be, for example, a plate or tray in the general shape of a row of teeth. The bite fork generally includes an impressionable material that can be used to take an impression of a patient's teeth. In operation, the bite fork may be placed into a patient's mouth. After placement, the patient is instructed to bite down onto the bite fork such that an impression of the patient's teeth is formed in the impressionable material. To record an accurate relationship of the patient's teeth to the cranial base that can be transferred to the jaw simulator, the bite fork must remain stabile when the patient is biting down. However, there is currently no easy or effective way to stabilize the bite fork in the patient's mouth.

Thus, there is a need for apparatus and methods that can stabilize the bite fork in the patient's mouth.

SUMMARY

This invention relates to the field of dental instruments and, more particularly, in one or more embodiments, to elastically deformable bite fork stabilizers and associated methods.

An embodiment of the present invention includes an apparatus for stabilizing a bite fork in a patient's mouth. The apparatus may comprise an elastically deformable bite fork stabilizer. The elastically deformable bite fork stabilizer may comprise an elastically deformable layer, an adhesive layer on one side of the elastically deformable layer, and a removable layer adhered to the adhesive layer.

An embodiment of the present invention includes an apparatus for use in recording a maxillary-arch relationship of a patient's teeth. The apparatus may comprise a bite fork and an elastically deformable bite fork stabilizer coupled to a bottom surface of the bite fork. The elastically deformable bite fork stabilizer may comprise an elastically deformable layer and an adhesive layer disposed between the elastically deformable layer and the bite fork.

Another embodiment of the present invention includes a method of stabilizing a bite fork. The method may comprise coupling an elastically deformable bite fork stabilizer to a bottom surface of the bite fork. The elastically deformable bite fork stabilizer may comprise an elastically deformable layer and an adhesive layer on one side of the elastically deformable layer. The method further may comprise placing the bite fork into a mouth.

The features and advantages of the present invention will be apparent to those skilled in the art. While numerous changes or modifications may be made by those skilled in the art, such changes and modifications are within the spirit of the invention.

BRIEF DESCRIPTION OF THE DRAWINGS

These drawings illustrate certain aspects of the present invention and should not be used to limit or define the invention.

FIG. 1 is a side view that illustrates an elastically deformable bite fork stabilizer in accordance with embodiments of the present invention.

FIG. 2 is a top view that illustrates an elastically deformable bite fork stabilizer in accordance with embodiments of the present invention.

FIG. 3 is a view illustrating an alternate configuration of an elastically deformable bite fork stabilizer in accordance with embodiments of the present invention.

FIG. 4 is a view illustrating another alternate configuration of an elastically deformable bite fork stabilizer in accordance with embodiments of the present invention.

FIG. 5 is a view illustrating another alternate configuration of an elastically deformable bite fork stabilizer in accordance with embodiments of the present invention.

FIG. 6 is a view illustrating another alternate configuration of an elastically deformable bite fork stabilizer in accordance with embodiments of the present invention.

FIG. 7 is a view illustrating another alternate configuration of an elastically deformable bite fork stabilizer in accordance with embodiments of the present invention.

FIG. 8 is a top view illustrating a bite fork in accordance with embodiments of the present invention.

FIG. 9 is a bottom view illustrating an elastically deformable bite fork stabilizer coupled to a bite fork in accordance with embodiments of the present invention.

FIG. 10 is a side view illustrating an elastically deformable bite fork stabilizer coupled to a bite fork in accordance with embodiments of the present invention, FIG. 11 is a close-up view illustrating an elastically deformable bite fork stabilizer coupled to a bite fork in accordance with embodiments of the present invention.

FIG. 14 is a view illustrating use of two or more elastically deformable bite fork stabilizers in accordance with embodiments of the present invention.

FIG. 15 is a view illustrating stacking of two or more elastically deformable bite fork stabilizers in accordance with embodiments of the present invention.

FIGS. 16-17 are views illustrating a dental impression pad in accordance with embodiments of the present invention.

FIG. 18 is a top view illustrating use of two or more dental impression pads on a bite fork in accordance with embodiments of the present invention.

DESCRIPTION OF PREFERRED EMBODIMENTS

Figures 12, 13:
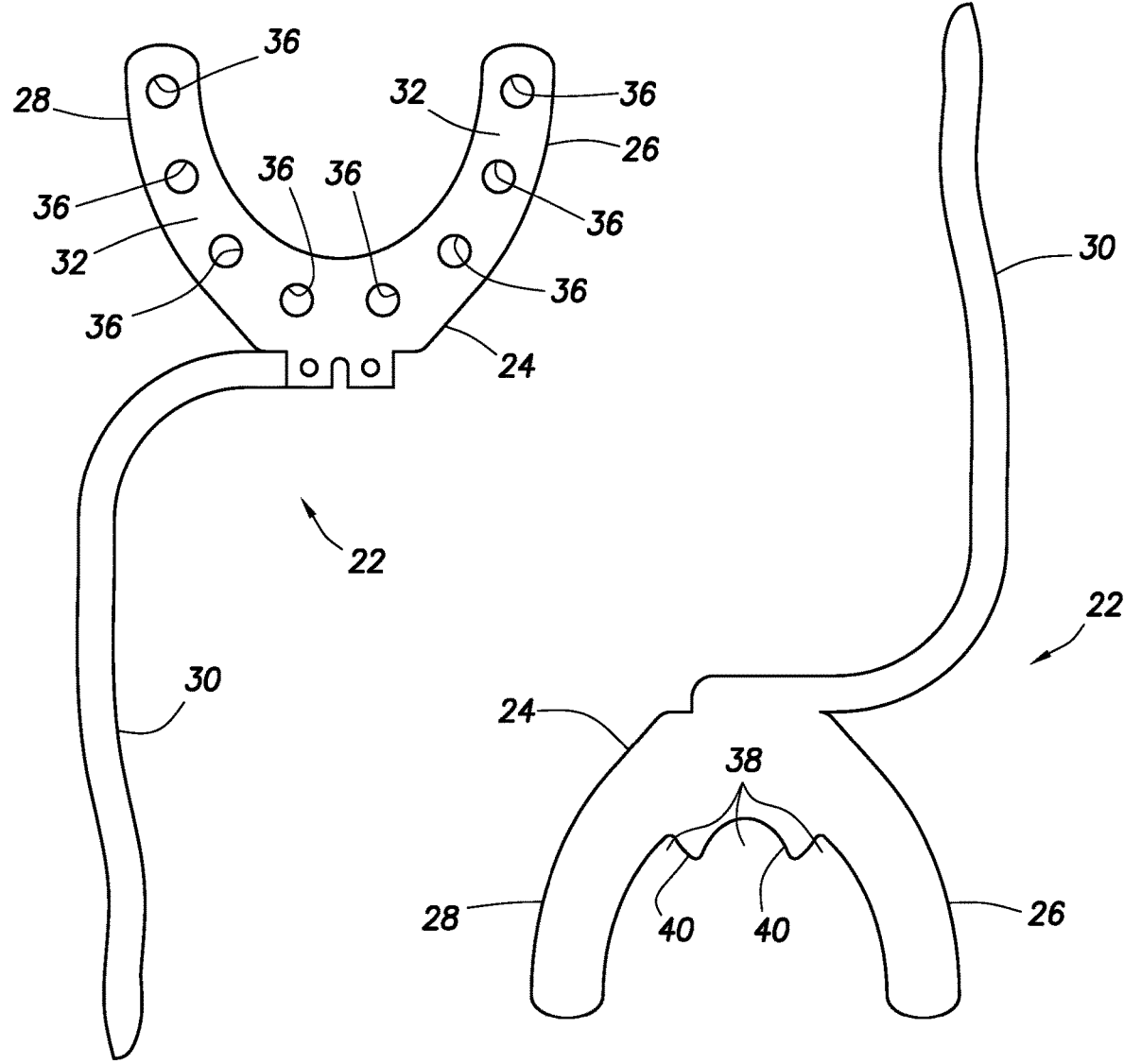
FIG. 12 is a view illustrating an alternate configuration of a bite fork in accordance with embodiments of the present invention.
FIG. 13 is a view illustrating another alternate configuration of a bite fork in accordance with embodiments of the present invention.

This invention relates to the field of dental instruments and, more particularly, in one or more embodiments, to elastically deformable bite fork stabilizers and associated methods. There may be several potential advantages to the methods and apparatus of the present invention, only some of which may be alluded to herein. One of the many potential advantages of the methods and apparatus of the present invention is that a bite fork may be stabilized in a patient's mouth. In accordance with embodiments of the present invention, stabilization of the bite fork in the patient's mouth should allow for a more accurate relationship of the patient's teeth to the cranial base, thus allowing replication of the patient's particular situation to a jaw simulator.

Referring now to FIGS. 1 and 2, an elastically deformable bite fork stabilizer 10 in accordance with one embodiment of the present invention is illustrated. In general, the bite fork stabilizer 10 may be placed on a bottom side of a bite fork to hold a patient's teeth against the bite fork. As illustrated, the bite fork stabilizer 10 may include an elastically deformable layer 12, an adhesive layer 14 on one side of the elastically deformable layer 12, and a removable protective layer 16 on the opposite of the adhesive layer 14 from the elastically deformable layer 12. In the illustrated embodiment, the bite fork stabilizer 10 is generally u-shaped having a first leg 18 and a second leg 20. As will be discussed in more detail below, embodiments of the present invention may include removing the removable protective layer 16 from the bite fork stabilizer 10 and attaching the bite fork stabilizer 10 to a bottom side of a bite fork. The adhesive layer 14 generally may adhere the bite fork stabilizer 10 to the bite fork.

While the bite fork stabilizer 10 of FIGS. 1-2 is illustrated as having a generally u-shaped pattern, it should be understood that the bite fork stabilizer 10 may have a variety of different shapes in accordance with embodiments of the present invention. FIGS. 3-7 illustrate a bite fork stabilizer 10 having a variety of different shapes that may be suitable for use in present embodiments. For example, the bite fork stabilizer 10 may be configured in straight strips (FIG. 3), squares (FIG. 4), triangles (FIG. 5), circles (FIG. 6), elliptical sections (FIG. 7), or a variety of other patterns. It should be understood that the bite fork stabilizer 10 of the embodiments of FIGS. 3-7 may generally comprise an elastically deformable layer 12, an adhesive layer 14 on one side of the elastically deformable layer, and a removable protective layer 16 on the opposite of the adhesive layer 14 from the elastically deformable layer 12. It should be further understood that depending on the shape of the elastically deformable layer 12 more than one bite fork stabilizer 10 may be used for a particular application. For example, as discussed in more detail below with respect to FIGS. 14-15, two or more bite fork stabilizers 10 in the shape of strips, squares, triangles, circles, and/or elliptical sections may be applied to a bite fork in accordance with embodiments of the present invention. In certain embodiments (FIG. 15), two or more bite fork stabilizers 10 may be stacked on a bite fork, for example, with the adhesive layer 14 of one of the stabilizers 10 coupled to the elastically deformable layer 12 of another of the stabilizers 10. In alternative embodiments (FIG. 14), two or more bite fork stabilizers 10 may be spaced around the bottom surface of the bite fork.

The elastically deformable layer 12 is generally referred to herein as "elastically deformable" because deformation from the stress of a patient's bite is recoverable after the stress is removed. In other words, the elastically deformable layer 12 should not permanently deform from the stress of a patient's bite. The elastically deformable layer 12 may include any of a variety of elastically deformable materials, including, for example, foams. Examples of suitable foams include both open-cellular and closed-cellular foams. In one embodiment, the elastically deformable layer includes a polyethylene foam, such as a crosslinked polyethylene foam. An example of a suitable high-density crosslinked polyethylene foam is Qycell #T-30, available from Arlon Engineered Coated Products.

The elastically deformable layer 12 may be sized, for example, to avoid undesirably interfering with the patient's tongue when placed into a patient's mouth on a bite fork. Those of ordinary skill in the art will appreciate that the elastically deformable layer 12 may have a variety of sizes suitable for use in the desired application. For example, the elastically deformable layer 12 may have a variety of thicknesses (t), including, for example, in the range of from about 4 mm to about 13 mm and, more particularly, in the range of from about 6 mm to about 7 mm. By way of further example, the elastically deformable layer 12 may have a variety of different widths (w1), including, for example, in the range of from about 3 mm to about 65 mm. Smaller widths of the elastically deformable layer 12 may be particularly suited for embodiments where multiple bite fork stabilizers may be used in accordance with present invention. By way of further example, the first leg 18 and the second leg 20 of the elastically deformable layer 12 may have widths (w2) in the range of from about 10 mm to about 30 mm. Additional embodiments may have a width (w2) of the first leg 18 and the second leg 20 in the range of from about 21 mm to about 27 mm and, alternatively, of about 15 to about 22 mm.

Embodiments of the elastically deformable layer bite fork stabilizer 10 further may include an adhesive layer 14. In general, the adhesive layer 14 should have sufficient adhesion to adhere the bite fork stabilizer 10 to the bite fork in a desired position when used in the patient's mouth. However, the removable protective layer 16 should be readily removable from the bite fork stabilizer 10 when ready for use, for example, by lifting the protective layer 16 away from the bite fork stabilizer 10. In other words, the adhesive layer 14 should not prevent removing of the removable protective layer 16 prior to use. In certain embodiments, when the bite fork stabilizer 10 is formed, a surface of the elastically deformable layer 12 may be coated with an adhesive to form the adhesive layer 14. After application of the adhesive, the removable protective layer 16 may be placed over the adhesive layer 14, for example. When the bite fork stabilizer 10 is used, the removable protective layer 16 may be removed, and the surface of the bite fork stabilizer 10 with the adhesive may be pressed against the bite fork. In one embodiment, a suitable adhesive is available in the form of rolls of Mylar® tape, precoated with an adhesive covered by a removable protective layer 16.

Embodiments of the elastically deformable bite fork stabilizer 10 also may include a removable protective layer 16. As described above, the removable protective layer 16 may be removed by lifting it away from the bite fork stabilizer 10. Alternatively, for example, the protective layer 16 may be removed by lifting the bite fork stabilizer 10 away from the protective layer 16. In certain embodiments, the protective layer 16 may be in the form of a sheet having two or more bite fork stabilizers 10 arranged thereon.

Referring now to FIGS. 8-11, a bite fork 22 having a bite fork stabilizer 10 disposed thereon is illustrated in accordance with embodiments of the present invention. FIG. 11 is a close-up view illustrating the attachment of the bite fork stabilizer 10 to the bite fork 22 taken along circle 23. As illustrated, the bite fork 22 may be in the general shape of a row of teeth. For example, the bite fork may be a U-shaped (or horseshoe-shaped) bite fork, as shown in FIGS. 8-9. As illustrated, the bite fork 22 may, for example, include a base 24 having a first arm 26 and a second arm 28 extending therefrom to give the bite fork 22 the U-shape. The bite fork 22 also may include a handle 30 to support the bite fork 22 during use. The bite fork 22 also may include a top surface 32 and a bottom surface 34. In the illustrated embodiment, a bite fork stabilizer 10 is coupled (directly or indirectly) to the bottom surface 34 of the bite fork 22. In certain embodiments, the protective layer 16 may be removed from the bite fork stabilizer 10, and the surface of the stabilizer 10 with the adhesive layer 14 may be pressed against the bite fork 22 to adhere the bite fork stabilizer 10 thereto.

Referring now to FIG. 12, an alternate configuration of the bite fork 22 is illustrated that may be used in accordance with embodiments of the present invention. As illustrated, the bite fork 22 may include a base 24 having a first arm 26 and a second arm 28. The bite fork 22 further may include a handle 30 for supporting the bite fork 22. In the illustrated embodiment, the bite fork 22 further includes holes 36 that extend from the top surface 32 through the bottom surface 34 of the bite fork 22. In accordance with embodiments of the present invention, the bite fork stabilizer 10 may be coupled to the bottom surface 34 of the bite fork 22 illustrated in the embodiment of FIG. 12.

FIG. 13 illustrates another configuration of a bite fork 22 that may be suitable for use in embodiments of the present invention. As illustrated, the bite fork 22 may include a base 24 having a first arm 26 and a second arm 28. The bite fork 22 further may include a handle 30 for supporting the bite fork 22. In the illustrated embodiment, the base 24 includes openings 38 that form teeth or protrusions 40 that extend from the base 24 between the first arm 26 and the second arm 28. In accordance with embodiments of the present invention, the bite fork stabilizer 10 may be coupled to the bottom surface 34 of the bite fork 22 illustrated in the embodiment of FIG. 13.

Referring now to FIGS. 14-15, the use of two or more bite fork stabilizers 10 is illustrated in accordance with embodiments of the present invention. FIG. 14 illustrates an embodiment of the present invention that includes two or more bite fork stabilizers 10 spaced around the bottom surface 34 of the bite fork 22. FIG. 15 illustrates another embodiment of the present invention that includes a first bite fork stabilizer 10a and a second bite fork stabilizer 10b on the bite fork 22. As illustrated, the adhesive layer 14a of the first bite fork stabilizer 10a may be coupled to bottom surface 34 of the bite fork 22. As further illustrated, the adhesive layer 14b of the second bite fork stabilizer 10b may be coupled to the elastically deformable layer 12a of the first bite fork stabilizer 10a.

Furthermore, the bite fork 22 may be used in combination with an impressionable material. For example, an impressionable material may be disposed (directly or indirectly) on the top surface 32 of the bite fork 22. In general, the impressionable material may be any of a variety of materials suitable for taking impressions of a patient's teeth. By way of example, an impressionable material may be used that is generally a solid at room or body temperature, is impressionable for use in the mouth at about 120°-140° F., and may be melted at elevated temperatures (approx. 200° F.). Examples of suitable impressionable materials include molding, modeling or denture compounds, zinc oxide eugenol paste, silicon, plastics, wax, self-cured or light-cured resin, combinations thereof, and the like. Some of these materials may be initially soft at room temperature and then may be cured to harden by application of heat, light, chemicals, etc. In general, the impressionable material may initially have a flat shape so that a clear impression of the patient's teeth may be taken when the patient bites down on the bite fork 22.

In certain embodiments, the impressionable material may be a wax (or other suitable impressionable material) that is hard at room temperature, but generally softens with increasing temperatures. By way example, the wax may be melted at an elevated temperature (e.g., approx. 200° F.) and placed onto the bite fork 22. The material may then be allowed to cool to a temperature (e.g., approx. 120°-140° F.) where it is sufficiently soft to take an impression of a patient's teeth. After the impression is taken, the wax may be allowed to cool to room temperature where it hardens with the desired impression therein. The wax may be cooled, for example, by running water over the bite fork 22.

Referring now to FIGS. 16-18, a dental impression pad 42 is illustrated that may be used to apply an impressionable material 44 to a bite fork 22 in accordance with embodiments of the present invention. As illustrated, the dental impression pad 42 may comprise a backing strip 46, a mound or pad of impressionable material 44 on one side of the backing strip 46, and an adhesive 48 on another side of the backing strip. In certain embodiments, more than one dental impression pad 42 may be coupled (directly or indirectly) to the top surface 32 of the bite fork 22. Prior to use, a removable protective layer (not illustrated) may be disposed over the adhesive 48. When the dental impression pad 42 is used, the protective layer may be removed, and the surface of the impression pad 42 with the adhesive 48 may be pressed against the bite fork 22. In certain embodiments, glue or an adhesive may not be required to adhere the impressionable material 44 to the backing strip 46 as the impressionable material 44 generally should securely fasten to the backing strip 46 when the material is heated. However, in certain embodiments, a permanent adhesive may be used to couple the impressionable material 44 to the backing strip 46, if desired. While the impression pad 42 is illustrated as generally oval-shaped, other shapes may be used for the pad, including a U-shaped pattern, strips, circles, and/or squares.

Figure 19:
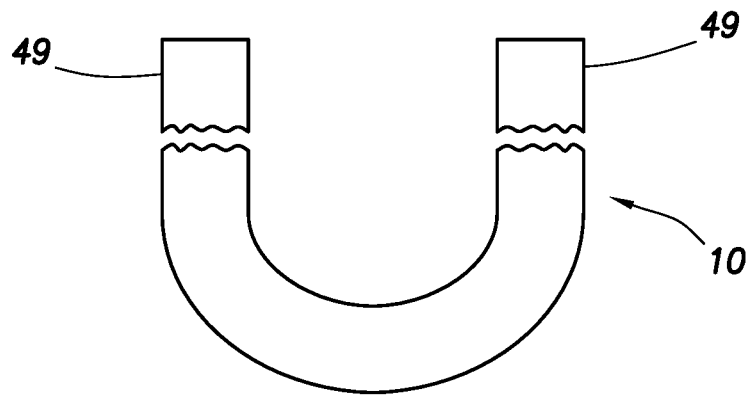
FIG. 19 is a view illustrating removal of one or more portions of an elastically deformable bite fork stabilizer in accordance with embodiments of the present invention.

Embodiments of the elastically deformable bite fork stabilizers 10 may be used to relate a patient's maxillary teeth to a mechanical jaw simulator, in accordance with embodiments of the present invention. The following is a non-limiting description of one example method for using an elastically deformable bit fork stabilizer 10 in a dental procedure. It should be understood that, in accordance with embodiments of the present invention, a bite fork 22 having an impressionable material 44 may be placed into a patient's mouth and imprinted with the patient's maxillary teeth. In certain embodiments, the impressionable material 44 may then be cooled to maintain its shape. The bite fork 22 may then be dried off so that a bite fork stabilizer 10 may be coupled thereto. Prior to coupling the bite fork 22 and bite fork stabilizer 10, the protective layer 16 may be removed from the bite fork stabilizer 10. The adhesive layer 14 of the bite fork stabilizer 10 may then be pressed onto the bottom surface 34 of the bite fork 22. It should be understood that, depending, for example, on the shape and size of the bite fork stabilizer 10, more than one bite fork stabilizer 10 may be coupled to the bite fork 22. The bite fork 22 may then be returned to the patient's mouth, and the maxillary teeth may be fitted into the imprints that were previously made. The patient may then be instructed to bite down on the bite fork stabilizer 10 to hold the bite fork 22 against the upper teeth. If needed for better stabilization, the thickness of the elastically deformable layer 12 may then be modified, for example, to compensate for a patient's particular situation. Modification of the thickness may allow, for example, the patient to help control the mounting equipment (e.g., facebow, earbow, or hinge-axis mounting equipment), thereby allowing the operator to concentrate on proper alignment of this equipment. By way of example, the thickness of the elastically deformable layer 12 may be cut to a smaller size. In other embodiments, two or more elastically deformable bite fork stabilizers 10 may be stacked to provide a larger elastically deformable layer 12. The shape of the bite fork stabilizer 10 may also be modified, for example, by cutting off one or more portions of the stabilizer 10, to compensative for a patient's particular situation. As illustrated by FIG. 19, one or more ends 49 of the bite fork stabilizer 10 may be cut off in accordance with embodiments of the present invention. After the relationship has been recorded, the bite fork 22 may be removed from the patient's mouth. The bite fork stabilizer 10 may then be removed from the bottom surface 34 of the bite fork 22 and disposed of at this time.

Figure 20:
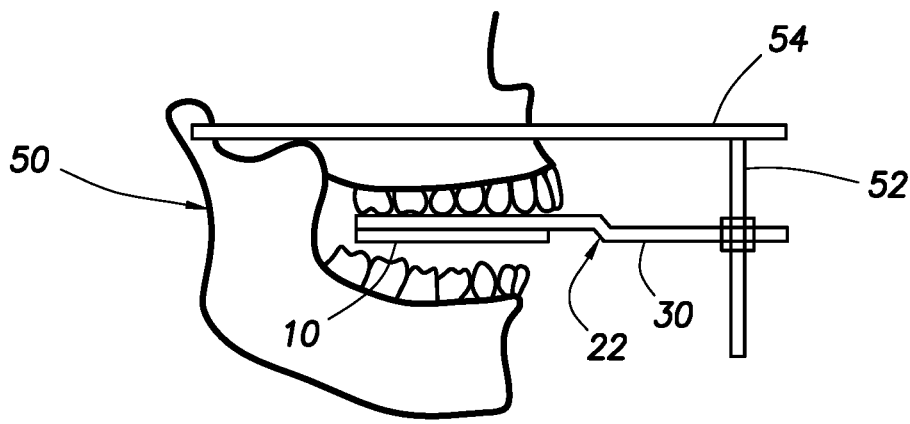
FIG. 20 is a view illustrating use of a bite fork to record a patient's maxillary-arch relationship in accordance with embodiments of the present invention.
Figure 21:
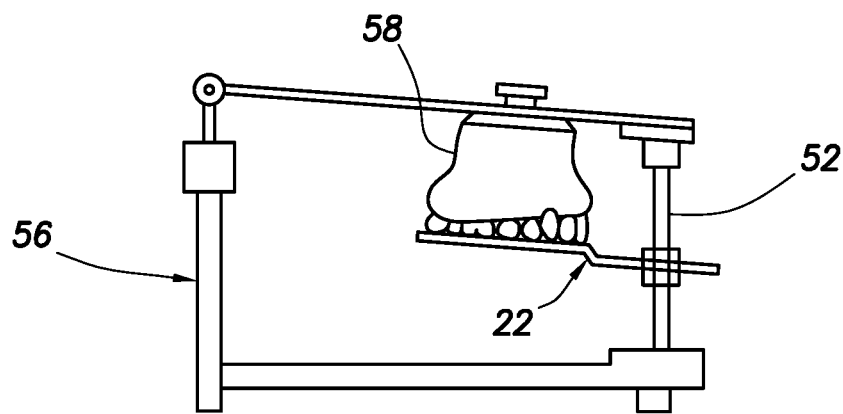
FIG. 21 is a view illustrating use of a bite fork to transfer the recorded maxillary-arch relationship to a mechanical jaw simulator in accordance with embodiments of the present invention.

FIGS. 19-20 illustrate a method for use of an elastically deformable bite fork stabilizer 10, in accordance with one embodiment of the present invention. As illustrated in FIG. 19, a bite fork 22 in combination with appropriate mounting equipment may be used to record the maxillary-arch relationship in a patient's mount 50. In this process, a bite fork stabilizer 10 may be used to stabilize the bite fork 22 in the patient's mouth 50. The bite fork 22 may be mounted in the patient's mouth using, for example, a bite fork stem assembly 52 and a facebow/earbow 54. As illustrated, the handle 30 of the bite fork 22 may be coupled to the bite fork stem assembly 54 which is in turn coupled to the facebow/earbow 54. While not illustrated, the facebow/earbow 54 may be secured to the patient's head. After the relationship has been recorded, the bite fork 22 may be removed from the patient's mouth 50, and the bite fork 22 may then be used to transfer the maxillary-arch relationship to a mechanical jaw simulator 56 (or dental articulator. FIG. 20 illustrates an example of a mechanical jaw simulator 56 (or dental articulator) to which the maxillary-arch relationship has been transferred. As illustrated, the bite fork 22 may be coupled to the bite fork stem assembly 54, which is in turn coupled to the jaw simulator 56. The bite fork stem assembly 54 may hold the bite fork 22 against a maxilla model 58.

Although the present invention and its advantages have been described in detail, it should be understood that various changes, substitutions and alterations may be made herein without departing from the spirit and scope of the invention as defined by the appended claims. While apparatus and methods are described in terms of "comprising," "containing," "having," or "including" various components or steps, the apparatus and methods can also "consist essentially of" or "consist of" the various components and steps.

What is claimed is:

1. A method of applying an apparatus to determine the maxillary arch relationship of a dental patient comprising, wherein the apparatus is for disposition in recording a maxillary-arch relationship of a patient's teeth comprising;
    a) a bite fork, the bite fork including a generally u-shaped planar member having a upper surface and a lower surface; and a first arm extending from a second arm thereby forming the U-shaped planar member;
    b) an impressionable material coupled to the top surface of the bite fork;
    c) a removably attachable bite fork stabilizer comprising a u-shaped member having a first leg and a second leg extending from the first leg to thereby form the u-shaped member; the u-shaped member formed of an elastically deformable material and adherently secured to the bite fork, whereby the bite fork stabilizer is positioned to fit directly above all the lower teeth of a patient when the apparatus is inserted into the patient's mouth; and
    d) an adhesive layer disposed between the bite fork and the bite fork stabilizer; wherein the method comprises;
    a) positioning the bite fork within the patient's mouth,
    b) making an impression of one or more maxillary teeth of the patient;
    c) removing the bite fork from the patient's mouth and securing the bite fork stabilizer to an underside portion of the bite fork;
    d) repositioning the bite fork stabilizer in the patient's mouth; and
    e) instructing the patient to bite down on the bite fork whereby the bite fork is stabilized within the patient's mouth.

2. The method of claim 1 further including establishing the maxillary arch relationship and transferring the maxillary arch relationship to a mechanical jaw simulator or to a dental articulator.

\* \* \* \* \*